United States Patent
Lee et al.

(10) Patent No.: US 7,870,742 B2
(45) Date of Patent: Jan. 18, 2011

(54) INTERSTAGE COOLED TURBINE ENGINE

(75) Inventors: Ching-Pang Lee, Cincinnati, OH (US); Thomas Ory Moniz, Loveland, OH (US); Robert Joseph Orlando, West Chester, OH (US)

(73) Assignee: General Electric Company, Schenectady, NY (US)

( * ) Notice: Subject to any disclaimer, the term of this patent is extended or adjusted under 35 U.S.C. 154(b) by 969 days.

(21) Appl. No.: 11/595,606

(22) Filed: Nov. 10, 2006

(65) Prior Publication Data

US 2008/0112793 A1   May 15, 2008

(51) Int. Cl.
  *F02C 6/08* (2006.01)
(52) U.S. Cl. ............................. 60/782; 60/785
(58) Field of Classification Search ................... 60/782, 60/785, 806; 415/115, 116, 175, 176
  See application file for complete search history.

(56) References Cited

U.S. PATENT DOCUMENTS

| 3,034,298 | A | | 5/1962 | White |
| 4,080,785 | A | | 3/1978 | Koff et al. |
| 4,741,153 | A | | 5/1988 | Hallinger et al. |
| 4,852,355 | A | * | 8/1989 | Kenworthy et al. ............ 60/751 |
| 5,134,844 | A | | 8/1992 | Lee et al. |
| 5,135,354 | A | | 8/1992 | Novotny |
| 5,142,859 | A | | 9/1992 | Glezer et al. |
| 5,174,105 | A | | 12/1992 | Hines |
| 5,232,339 | A | | 8/1993 | Plemmons et al. |
| 5,288,210 | A | | 2/1994 | Albrecht et al. |
| 5,317,877 | A | * | 6/1994 | Stuart ........................... 60/736 |
| 5,472,313 | A | | 12/1995 | Quinones et al. |
| 5,498,126 | A | | 3/1996 | Pighetti |
| 5,555,721 | A | | 9/1996 | Bourneuf et al. |
| 5,611,197 | A | | 3/1997 | Bunker |
| 5,996,331 | A | | 12/1999 | Palmer |
| 6,050,079 | A | | 4/2000 | Durgin et al. |
| 6,092,991 | A | * | 7/2000 | Tomita et al. ............. 416/96 R |
| 6,183,193 | B1 | | 2/2001 | Glasspoole et al. |
| 6,220,814 | B1 | * | 4/2001 | Brushwood et al. ........... 415/47 |
| 6,331,097 | B1 | | 12/2001 | Jendrix |
| 6,487,863 | B1 | | 12/2002 | Chen et al. |

(Continued)

FOREIGN PATENT DOCUMENTS

DE    2065334 A1    4/1973

(Continued)

OTHER PUBLICATIONS

General Electric Company, "CF6-80C2 Engine Airflow FADEC Control," Engine in public use and on sale in US more than one year before Sep. 1, 2006, single page.

(Continued)

*Primary Examiner*—William H Rodríguez
*Assistant Examiner*—Andrew Nguyen
(74) *Attorney, Agent, or Firm*—William S. Andes; Francis L. Conte (57) ABSTRACT

A gas turbine engine includes a compressor, combustor, and high pressure (HP) turbine operatively joined together. An interstage cooling circuit is joined in flow communication from an intermediate stage of the compressor to a forward face of an HP disk supporting a row of turbine blades for channeling interstage bleed cooling air thereto.

29 Claims, 4 Drawing Sheets

U.S. PATENT DOCUMENTS

| | | |
|---|---|---|
| 6,923,247 B1 | 8/2005 | Ferber et al. |
| 6,960,060 B2 | 11/2005 | Lee |
| 6,981,841 B2 | 1/2006 | Krammer et al. |
| 2004/0179936 A1 | 9/2004 | Fitzgerald et al. |
| 2005/0111964 A1 | 5/2005 | Krammer et al. |

FOREIGN PATENT DOCUMENTS

| | | |
|---|---|---|
| EP | 0584958 A1 | 3/1994 |
| EP | 0543627 A1 | 5/1996 |
| EP | 0768448 A1 | 4/1997 |
| EP | 1262634 A2 | 12/2002 |
| EP | 1306521 A1 | 5/2003 |
| EP | 1503061 A1 | 2/2005 |
| EP | 1505254 A2 | 2/2005 |
| EP | 1528238 A2 | 5/2005 |
| EP | 1621734 A1 | 2/2006 |
| EP | 1643081 A2 | 4/2006 |
| GB | 2081392 A | 2/1982 |
| GB | 2420155 A | 5/2006 |

OTHER PUBLICATIONS

General Electric Company, "CFM56-5C2-CDP Air for Turbine Cooling," Engine in public use and on sale in US more than one year before Sep. 1, 2006, two pages.

U.S. Appl. No. 11/595,670, filed Nov. 10, 2006, by Ching-Pang Lee et al.

U.S. Appl. No. 11/595,669, filed Nov. 10, 2006, by Ching-Pang Lee 'et al.

U.S. Appl. No. 11/595,646, filed Nov. 10, 2006, by Ching-Pang Lee et al.

* cited by examiner

INTERSTAGE COOLED TURBINE ENGINE

BACKGROUND OF THE INVENTION

The present invention relates generally to gas turbine engines, and, more specifically, to turbine cooling therein.

In a gas turbine engine, air is pressurized in a compressor and mixed with fuel in a combustor for generating hot combustion gases. Energy is extracted from the combustion gases in turbine stages which power the compressor through one drive shaft, and produce additional work for powering an upstream fan in a turbofan aircraft engine application, or driving an external drive shaft for marine and industrial (M&I) applications.

The basic core engine typically includes a multistage axial compressor having rows of compressor blades and corresponding guide vanes which pressurize ambient air in stages and correspondingly increase the temperature thereof. The air discharged from the aft end of the compressor has the highest pressure, commonly referred to as compressor discharge pressure (CDP), and a correspondingly high temperature.

In an exemplary configuration, the compressor may have seven stages for increasing air pressure many times atmospheric pressure along with many hundreds of degrees of temperature increase due to the compression cycle. A fewer or greater number of compression stages may be used as desired for the specific design of the gas turbine engine and its intended use.

A majority of the CDP air discharged from the compressor is mixed with fuel in the combustor for generating hot combustion gases. These combustion gases then undergo an expansion cycle in the several turbine stages for extracting energy therefrom which correspondingly reduces the pressure of the combustion gases and the temperature thereof. A high pressure turbine (HPT) immediately follows the combustor and is used to power the compressor blades in the core engine.

A low pressure turbine (LPT) follows the HPT and drives the second shaft for powering the upstream fan in the turbofan engine application, or driving an external drive shaft for M&I applications.

The overall efficiency of the gas turbine engine is dependent on the efficiency of air compression, efficiency of combustion, and efficiency of combustion gas expansion in the turbine stages.

Since turbine components are directly exposed to hot combustion gases during operation, they require suitable cooling thereof to ensure long useful life. For example, some of the compressor discharge air is diverted from the combustion process for cooling liners of the combustor itself, as well as cooling various components of the HPT.

Each turbine stage typically includes an upstream turbine nozzle or stator having a row of nozzle vanes which direct the combustion gases downstream through a corresponding row of turbine rotor blades. The blades are typically mounted to the perimeter of a supporting rotor disk in corresponding dovetail slots formed therein.

The turbine blades and vanes are typically hollow airfoils with corresponding internal cooling channels therein which receive compressor discharge air for cooling thereof during operation. The hollow blades and vanes typically include various rows of film cooling and other discharge holes through the pressure and suction sidewalls thereof for discharging the spent internal cooling air in corresponding external films for further protecting the airfoils.

Furthermore, the turbine rotor disk which supports the first stage turbine blades is a relatively large component with a rim in which the blades are mounted, a narrow web extending radially inwardly therefrom which terminates in a wider hub having a central bore. The rotor disk is subject to both considerable centrifugal loads and heating during operation and must also be designed for long life.

In contrast, the LPT requires less cooling than the HPT in view of the reduction in combustion gas temperature and pressure during the expansion cycle. The cooling requirements are therefore reduced, and typically interstage bleed air may be used for cooling various components therein.

The main turbine flowpath is designed to confine the combustion gases as they flow through the engine and decrease in temperature and pressure from the combustor. The various cooling circuits for the turbine components are independent from the main flowpath and must be provided with cooling air at sufficient pressure to prevent ingestion of the hot combustion gases therein during operation.

For example, suitable rotary seals are provided between the stationary turbine nozzles and the rotating turbine blades to prevent ingestion or back flow of the hot combustion gases into the cooling circuits. Since the airfoils of the nozzle vanes and turbine blades typically include rows of cooling air outlet holes, the cooling air must have sufficient pressure greater than that of the external combustion gases to provide a suitable backflow margin to prevent ingestion of the hot combustion gases into the turbine airfoils themselves.

Accordingly, the components of the HPT are typically cooled using the full-pressure CDP air, whereas LPT components may be cooled using lower pressure, interstage bleed air.

In this way, the use of compressor air for cooling turbine components may be matched to the different cooling requirements of the HPT and the LPT for reducing the use thereof and therefore increasing engine efficiency.

However, increasing engine efficiency is a continuing and paramount design objective in modern gas turbine engines, and it is therefore desired to further increase engine efficiency by reducing pressurized air extracted from the compressor.

BRIEF DESCRIPTION OF THE INVENTION

A gas turbine engine includes a compressor, combustor, and high pressure (HP) turbine operatively joined together. An interstage cooling circuit is joined in flow communication from an intermediate stage of the compressor to a forward face of an HP disk supporting a row of turbine blades for channeling interstage bleed cooling air thereto.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
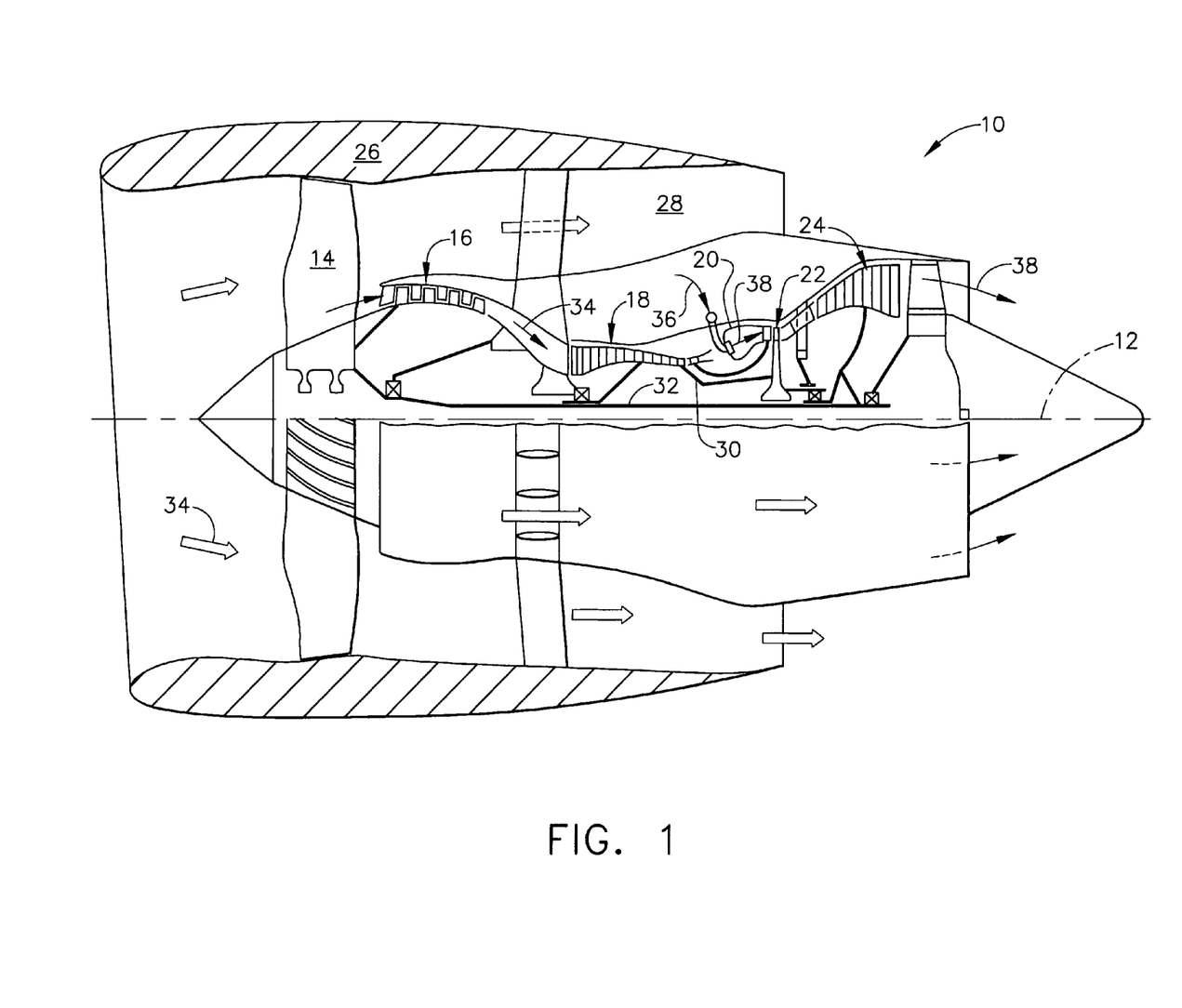
FIG. 1 is a partly sectional, axial schematic view of a turbofan gas turbine engine.

Illustrated schematically in FIG. 1 is an exemplary turbofan aircraft gas turbine engine 10. The engine is axisymmetrical about a longitudinal or axial centerline axis 12 and is suitably mounted to the wing or a fuselage of an aircraft (not shown) for powering an aircraft in flight in an exemplary application.

The engine includes in serial flow communication a fan 14, a low pressure or booster compressor 16, a high pressure (HP) compressor 18, an annular combustor 20, a high pressure turbine (HPT) 22, and a low pressure turbine (LPT) 24.

An annular nacelle 26 surrounds the fan 14 and defines an annular bypass duct 28 extending aft around the booster compressor 16. A first drive shaft 30 joins the HPT 22 to the HP compressor 18, and a second drive shaft 32 joins the LPT 24 to the fan 14 and booster compressor 16. The two drive shafts are suitably mounted in bearings in corresponding frames within the engine in a conventional configuration of the various engine components described above.

During operation, ambient air 34 enters the inlet of the engine and is pressurized in part by the fan 14 and discharged through the bypass duct 28 for providing a majority of propulsion thrust. Some of the air 34 passing the fan enters the booster compressor 16 and undergoes a further compression cycle in the multiple axial stages thereof, with additional compression also being provided in the HP compressor 18 in the multiple axial stages thereof.

The pressurized air 34 is discharged from the compressor and suitably mixed with fuel 36 in the combustor 20 for generating hot combustion gases 38. Energy is extracted from the combustion gases 38 in the HPT 22 to drive the first shaft 30 and power the HP compressor 18. Additional energy is extracted from the combustion gases in the LPT 24 to drive the second shaft 32 and power the fan 14 and booster compressor 16.

The engine as described above is conventional in configuration and operation and includes multiple compression stages and multiple turbine stages. For example, the booster compressor 16 may have four axial stages including four rows of compressor blades alternating axially with four rows of inlet guide vanes.

Figure 2:
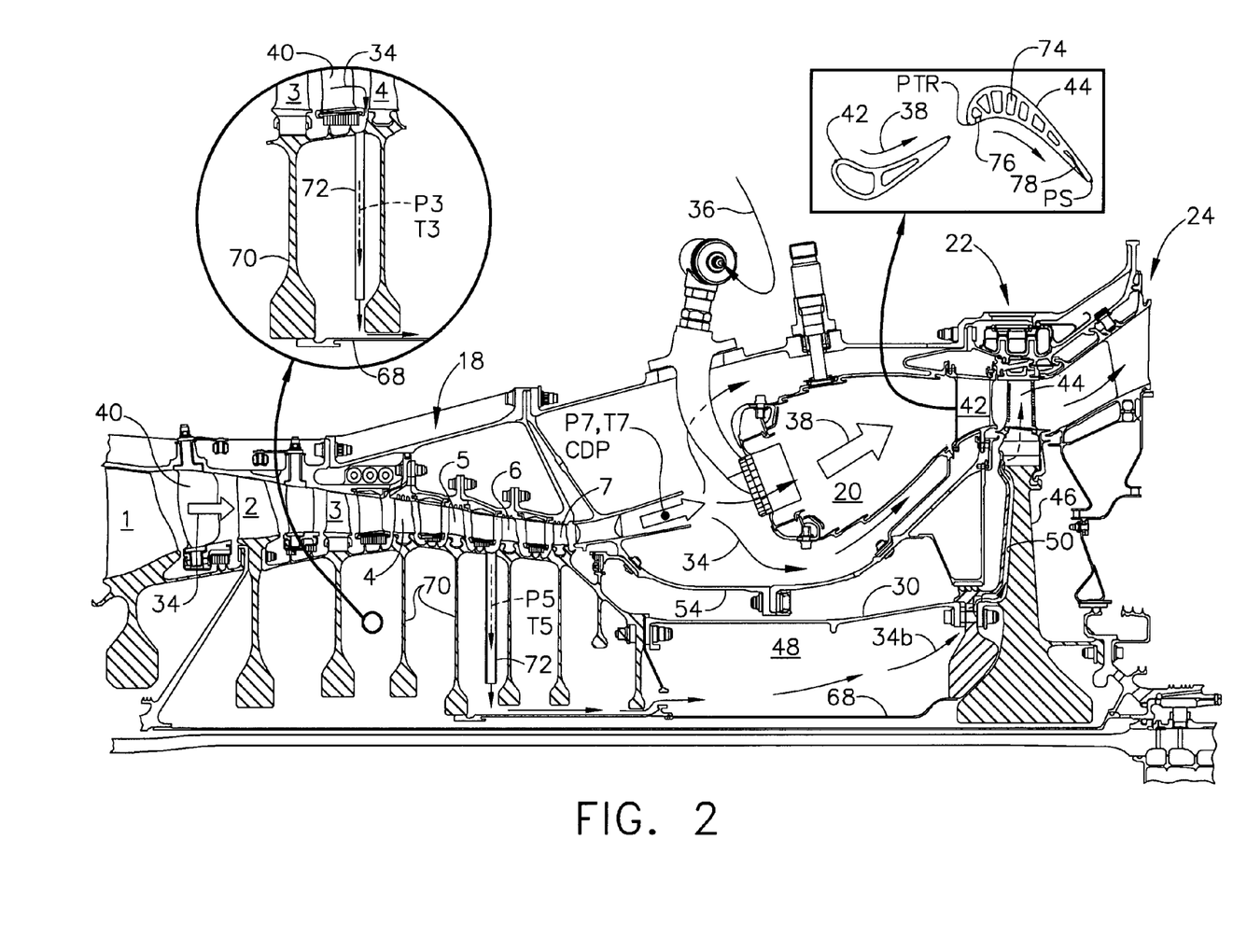
FIG. 2 is an enlarged, axial sectional view through a portion of the core engine illustrated in FIG. 1.

The high pressure compressor 18 may include seven axial stages for example, having seven rows of compressor blades 1-7 as shown in detail in FIG. 2 alternating axially with corresponding rows of inlet guide vanes 40, and discharging the CDP air through a conventional diffuser.

The HPT 22 is preferably a single stage turbine followed in turn by an exemplary five stage LPT 24.

FIG. 2 illustrates in more detail the basic core engine including the high pressure compressor 18, annular combustor 20, and HPT 22 disposed in serial flow communication.

The HPT 22 illustrated in FIG. 2 includes a first stage or HP turbine nozzle having a row of stator vanes 42 suitably mounted in outer and inner bands. Following the vanes is a single row of HP turbine blades 44 removably mounted to the perimeter or rim of a first stage or HP rotor disk 46. The disk 46 is fixedly joined to the first drive shaft 30 which in turn is fixedly joined to the rotor disks supporting the compressor blades 1-7 of the high pressure compressor 18.

The configuration and operation of the HP compressor 18 and the HPT 22 are conventional for pressurizing the air 34 and expanding the subsequent combustion gases 38 for extracting energy therefrom. In particular, the pressure and temperature of the air 34 increase axially in turn as the air flows downstream through the seven stages of compressor blades 1-7. The seventh row of compressor blades 7 defines the last stage of the compressor in this exemplary configuration and discharges the pressurized air at a maximum pressure P7 and a correspondingly high temperature T7 associated with the compressor discharge pressure (CDP) air.

The CDP air is mixed with the fuel in the combustor to generate the hot combustion gases 38 which are discharged from the outlet of the combustor between the first stage turbine nozzle vanes 42. These vanes are disposed axially between the combustor and the first stage turbine blades 44 and are conventionally configured for dropping or reducing the pressure in the combustion gases along the airfoil chord and across the leading and trailing edges of the vanes.

Each nozzle vane 42 has the typical generally concave pressure side and generally convex opposite suction side extending axially between the upstream leading edge and the downstream trailing edge. The contour of the nozzle vanes 42 may be suitably selected to effect a substantial pressure drop as the combustion gases flow downstream between the inlet and outlet ends of the turbine nozzle. Gases flowing through a turbine nozzle are accelerated and turned which causes a small drop in total pressure and a large drop in static pressure.

Correspondingly, the first stage turbine blades 44 also illustrated in FIG. 2 have the generally concave pressure side and generally convex opposite suction side extending axially between the leading and trailing edges thereof. The profile of the turbine blades 44 is also conventionally selected for additionally dropping or reducing pressure of the combustion gases 38 along the airfoil chord and across the leading and trailing edges thereof. Work or energy is extracted from the gases flowing between turbine rotor blades which causes a large drop in both total pressure and static pressure.

Whereas the compression stages increase pressure and temperature of the air as energy is added, the turbine stages decrease pressure and temperature of the combustion gases for extracting energy therefrom.

Since the use of a single stage HPT 22 illustrated in FIG. 2 permits a substantial pressure drop to occur in the combustion gases first across the nozzle vanes 42 and then across the turbine blades 44, an improved cooling circuit for the HPT 22 may be used for further increasing efficiency of the engine.

More specifically, FIG. 2 illustrates an annular interstage cooling circuit or channel 48 joined in flow communication from an intermediate stage of the HP compressor 18 to a forward face 50 of the first stage disk 46 for channeling pressurized interstage bleed air, designated 34b, for cooling thereof.

For example, the fifth intermediate stage as represented by the fifth row of the compressor blades 5 may be used as the source of the cooling bleed air 34b, which intermediate stage is disposed upstream from the last, seventh stage of the compressor 18. The choice of the intermediate stage is dependent on the compression cycle in the HP compressor 18 and the corresponding expansion cycle in the HPT 22.

More specifically, by introducing substantial pressure drop in the combustion gases 38 across the nozzle and blades of the HPT 22, a lower pressure interstage pressurized air may be bled from the compressor and suitably driven under differential pressure to the HPT while still maintaining a suitable backflow margin with a greater pressure than that of the combustion gases in the HPT.

Preferably, the intermediate stage of the compressor is selected to effect a static pressure (PS) in the pressurized air 34 which is suitably greater than the static pressure in the combustion gases at the trailing edges of the HP blades 44.

For example, the fifth intermediate stage is at least two stages upstream from the last or seventh stage in the compressor 18 and may be effectively used for providing the source of the bleed air 34b for the single-stage HPT 22.

As indicated above, the pressure and temperature of the air 34 increases in steps in each of the seven stages of the HP compressor 18, as represented by the corresponding row of the compressor blades 1-7. The collective or total increase in pressure of the air in the compressor may be quite great and reach 10-30 atmospheres, for example. Correspondingly, the rise in temperature of the pressurized air 34 across the compressor 18 may be many hundreds of degrees.

By utilizing non-CDP air in the interstage cooling circuit 48 disclosed above, a significant reduction in diversion of the CDP air may be obtained with a correspondingly large increase in engine efficiency. Since CDP air is the most expensive air in the engine attributable to the maximum work performed thereon for achieving the high pressure thereof, any diversion thereof from the combustion process itself correspondingly reduces engine efficiency. And, by limiting that diversion of CDP air the overall efficiency of the engine may be increased.

Figure 3:
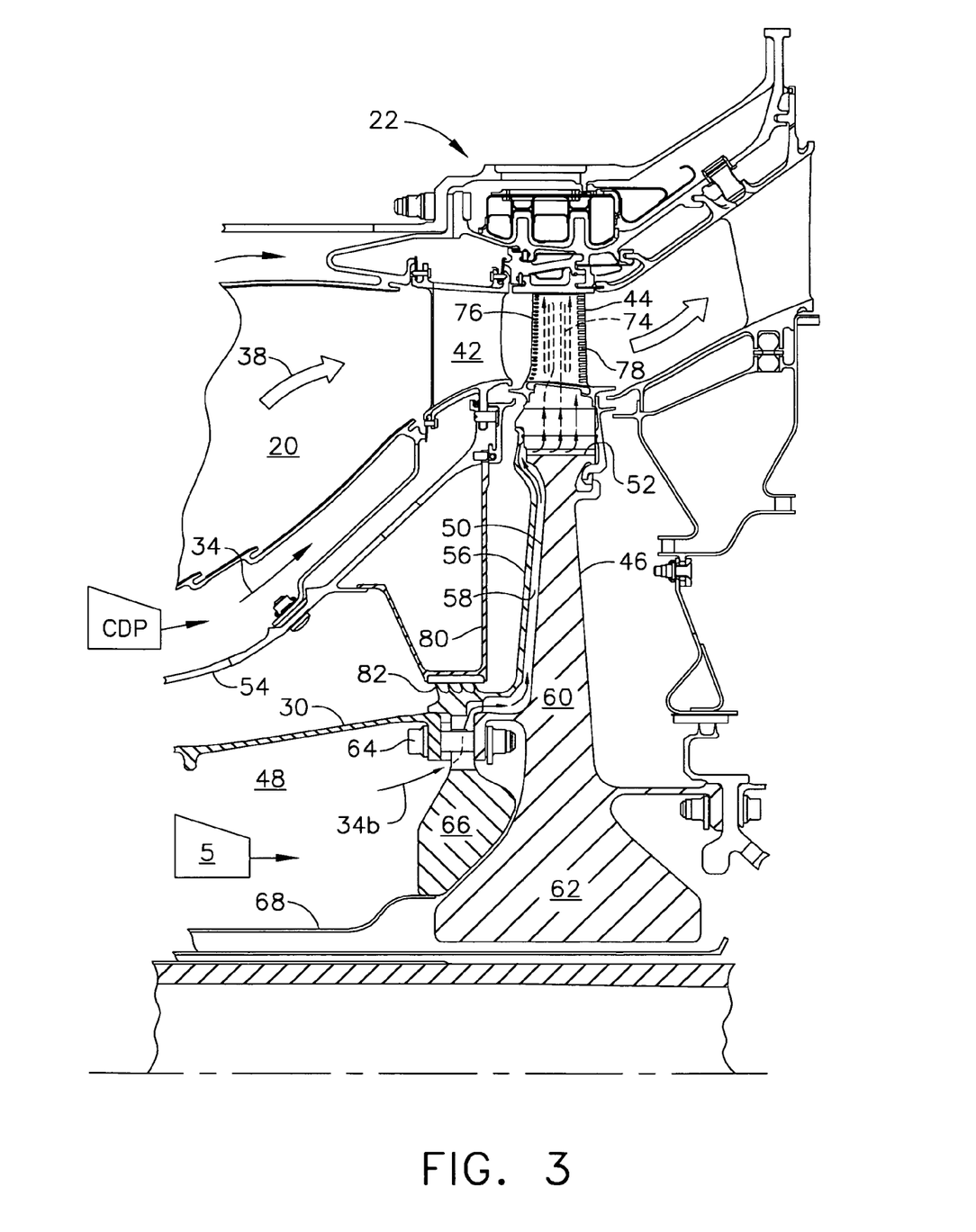
FIG. 3 is an enlarged, axial sectional view of the high pressure turbine illustrated in FIG. 2.

FIG. 3 illustrates in more detail the HPT 22 including the first stage rotor disk 46 which supports the row of first stage turbine blades 44 around the perimeter rim thereof. The interstage cooling circuit 48 begins at the intermediate compressor stage and terminates at the first stage turbine disk 46 for providing cooling air thereto.

The exemplary fifth stage bleed air 34b has corresponding static pressure P5 and total temperature T5 which are substantially less than the pressure P7 and temperature T7 of the CDP air 34 discharged from the last compressor stage. The cooler bleed air 34b is suitably channeled to the forward face 50 of the turbine disk 46 and provides more effective cooling thereof which correspondingly decreases thermal stress therein and improves life of the turbine disk 46.

Furthermore, the intermediate pressure P5 of the bleed air 34b is sufficiently high to prevent backflow or ingestion of the combustion gases 38 into the various cooling channels of the HPT where the bleed air 34b is channeled.

For example, FIGS. 2 and 3 illustrate that the interstage cooling circuit 48 may be conveniently disposed inside the first drive shaft 30 which extends axially between the compressor 18 and the HP disk 46. As indicated above, the individual turbine blades 44 have conventional dovetails which are mounted in corresponding dovetail slots 52 extending axially across the perimeter of the turbine disk 46. The interstage cooling circuit 48 is preferably configured to channel the bleed air 34b radially outwardly over the disk forward face 50 and into the dovetail slots 52 for enhanced cooling of the turbine disk itself.

The combustor 20 illustrated in FIGS. 2 and 3 is supported in a conventional manner radially around an annular inner combustor case 54 which provides circumferentially therearound an inner boundary for the CDP air from the compressor that is used for cooling the radially inner and outer liners of the combustor itself. The interstage cooling circuit 48 is therefore preferably independent from the CDP air channel surrounding the combustor inner case 54.

The HPT 22 illustrated in FIG. 3 further includes an annular forward seal plate 56 extending radially along the disk forward face 50 and spaced axially forward therefrom to define an annular distribution passage or manifold 58 which is disposed in flow communication with the dovetail slots 52 around the disk perimeter. The interstage cooling circuit 48 is suitably joined in flow communication with the inner end of the manifold 58.

In this way, the interstage bleed air 34b is channeled radially outwardly through the manifold 58 under centrifugal force as the disk 46 rotates during operation to deliver the bleed air into the full row of dovetail slots 52. The plate 56 may include impeller vanes (not shown) inside the manifold 58 for further increasing air pressure if desired.

The turbine disk 46 illustrated in FIG. 3 has the typical wide perimeter rim in which the axial dovetail slots 52 are formed, with a thinner annular web 60 extending radially inwardly therefrom and terminating in a wider central disk hub 62 having a center bore therethrough. The first drive shaft 30 is fixedly joined at an aft flange to the disk web 60 by a row of bolts 64. A secondary hub 66 is integrally joined at the base end of the forward seal plate 56 and is fixedly mounted in the bolted flanges using the same bolts 64. Suitable apertures are provided through the junction of the seal plate 56 and secondary hub 66 to provide flow communication between the interstage cooling circuit 48 and the manifold 58.

The interstage cooling circuit 48 is bounded outboard by the drive shaft 30 and is preferably bounded inboard by a tubular baffle 68 which extends axially forwardly from the bore of the secondary hub 66 upstream to the intermediate stage of the compressor.

For example, each of the seven stages of the HP compressor 18 shown in FIG. 2 includes a corresponding compressor rotor disk 70 supporting a corresponding row of the compressor blades 1-7, with corresponding dovetails and dovetail slots in the perimeters of the disks in a conventional configuration. The tubular baffle 68 preferably extends forward to the center bore of the hub of the fifth stage compressor disk 70 in sealing contact therewith.

The interstage cooling circuit 48 preferably also includes a plurality of circumferentially spaced apart inlet tubes 72 which extend radially inwardly from the base of the fifth stage compressor blades 5 along the corresponding compressor disk 70 to channel the interstage bleed air 34b radially inwardly and axially around the baffle 68 for flow to the outlet manifold 58. The inlet tubes 72 may have a conventional configuration for bleeding interstage pressurized air through corresponding apertures in the compressor rotor between adjacent rows of the compressor blades preferably in the region of the corresponding row of guide vanes therebetween.

As initially shown in FIG. 3, each of the turbine blades 44 may have any conventional configuration including an internal cooling circuit or channel 74 extending radially therethrough. The internal cooling circuit terminates in several rows of cooling holes through the airfoil portion of the blade including a row of leading edge or first holes 76 and another row of trailing edge or second holes 78.

The internal cooling channels 74 of the blades are suitably joined in flow communication with the HP compressor 18 for receiving pressurized air therefrom for internally cooling each blade. However, the pressure of the internal cooling air must be sufficiently greater than the pressure of the external combustion gases for maintaining suitable backflow margins at both the leading and trailing edges of the blades, and therebetween, to prevent ingestion or backflow of the combustion gases into the turbine blades during operation.

In the exemplary embodiment illustrated in FIG. 3, the blade cooling channels 74 are disposed in flow communication with the manifold 58 for receiving the interstage bleed air 34b from the interstage cooling circuit 48. In this way, the first stage turbine blades 44 may be supplied with the fifth stage bleed air at the corresponding fifth stage pressure P5 and temperature T5 for enhanced cooling of the turbine blades themselves, with sufficient backflow margin therein.

In FIG. 2, the fifth compressor stage is selected to provide cooling air to the HPT rotor since the fifth stage can effect a static pressure in the compressor bleed air 34b which is greater than the total relative pressure (PTR) in the combustion gases 38 at the leading edges of the first stage turbine blades 44 in the vicinity of the corresponding row of first cooling holes 76 thereat.

Since the turbine blades 44 rotate during operation, and first receive the incident combustion gases 38 along the leading edges thereof, the internal pressure of the cooling air being discharged through the leading edge holes 76 must be suitably greater than the total relative pressure of the external combustion gases to provide a suitable backflow margin to prevent ingestion of the combustion gases into the turbine blades.

Since the pressure of the combustion gases decreases between the leading and trailing edges of the turbine blades 44, the fifth stage bleed air still provides sufficient backflow margin at the row of second holes 78 disposed along the trailing edge of the turbine blades.

Accordingly, instead of cooling the first stage turbine blades 44 illustrated in FIG. 3 with CDP cooling air in a conventional manner, lower pressure, and lower temperature, interstage bleed air may be used for cooling not only the forward face 50 of the first stage disk 46, but also the first stage turbine blades 44 mounted to the perimeter of the disk.

The manifold 58 terminates at the dovetail slots 52 and delivers the interstage bleed air to corresponding inlets in the base of the blade dovetails for flow through the internal cooling circuits of the individual blades. The forward seal plate 56 preferably has an outer perimeter or rim which defines a forward blade retainer for the blades 44, which blades cooperate also with a conventional aft blade retainer on the opposite side of disk for axially trapping the blades in the corresponding axial dovetail slots.

In the exemplary embodiment illustrated in FIG. 3, CDP air is not used for cooling the first stage turbine blades or rotor disk, and therefore the conventional flow inducer may be eliminated in this design, which eliminates the corresponding complexity thereof. Instead, a simple annular seal frame 80 extends radially inwardly from the inner case 54 and includes an annular sealing pad in the central bore thereof to sealingly join labyrinth seal teeth 82 extending radially outwardly from the secondary hub 66 above the row of mounting bolts 64.

In this way, the CDP cooling circuit surrounding the combustor is isolated from the interstage cooling circuit 48 which provides interstage cooling air for cooling the forward face of the first stage disk and the turbine blades mounted thereon.

The use of non-CDP air for cooling the first stage turbine disk and blades is significant for the enhanced cooling thereof and for its compounding effect in improving the configuration and overall efficiency of the engine. Since the expensive CDP air is not used for turbine rotor cooling the overall efficiency of the engine increases.

Cooler air is used for cooling the turbine rotor and blades which therefore requires less cooling air and also allows for longer blade life. A cooler operating turbine rotor may then be formed from less expensive superalloys in view of the lower operating temperature thereof.

The inducer system for the CDP air is eliminated as described above, which simplifies engine design and allows lower weight thereof.

And, the elimination of CDP air for cooling the turbine rotor permits redesign of the HPT itself in conjunction with the compressor 18 and combustor 20 for further increasing the collective efficiency thereof.

Figure 4:
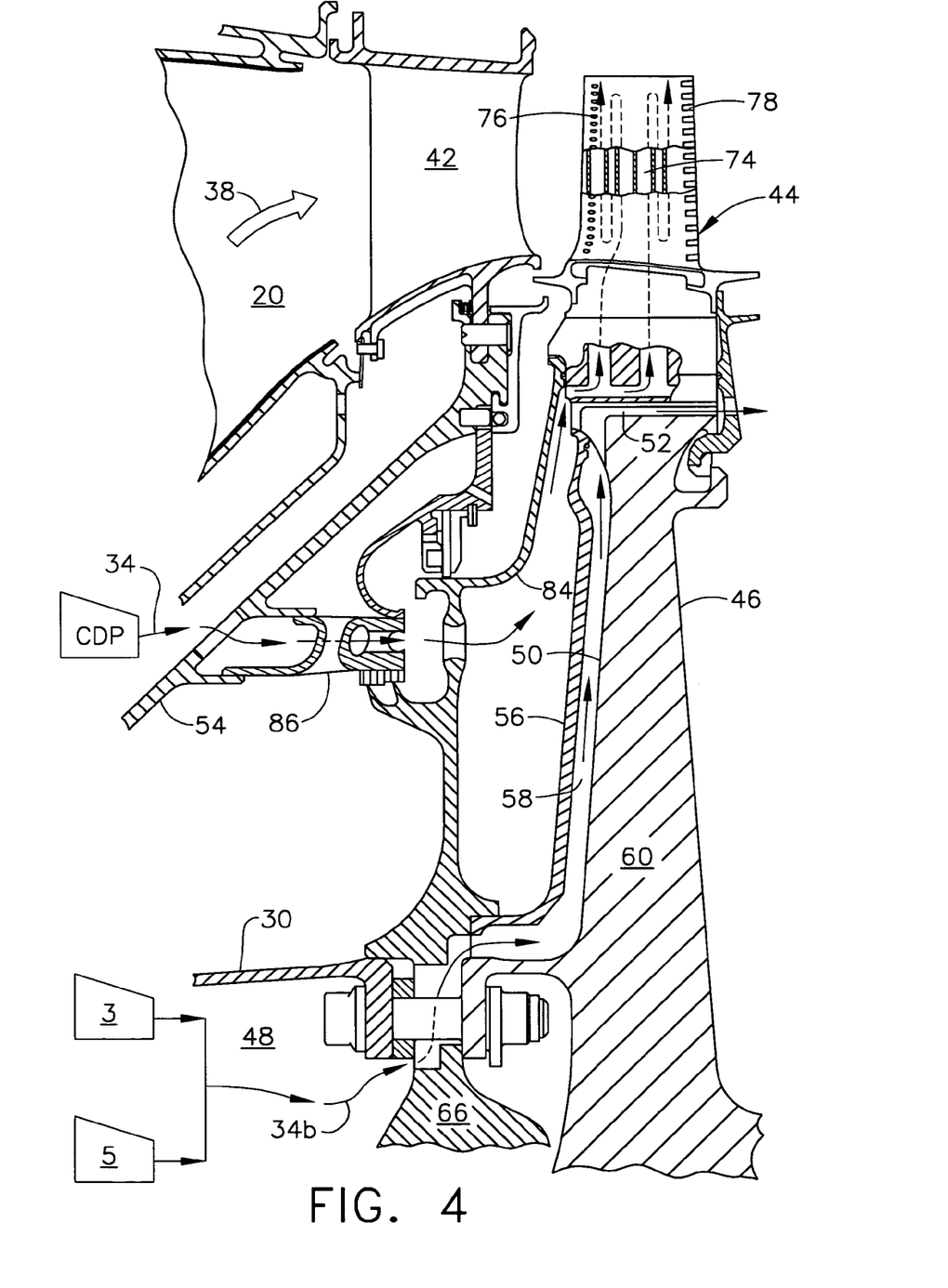
FIG. 4 is an enlarged, axial sectional view, like FIG. 3, of the high pressure turbine in accordance with an alternate embodiment.

However, the primary benefit of using interstage bleed air in the HPT rotor is cooling of the rotor itself, which is independent of blade cooling. FIG. 4 illustrates an alternate embodiment in which the internal blade cooling channels 74 are disposed in flow communication with the seventh or last stage of the compressor 18 in a corresponding circuit independent of the interstage cooling circuit 48.

In this embodiment, the forward seal plate 56 terminates at the base of the blade dovetails to channel the interstage bleed air 34b solely through the dovetail slots 52 and out corresponding apertures in the aft blade retainer of the turbine stage. A conventional annular forward blade retainer 84 extends radially outwardly from the secondary hub 66 to the first stage turbine blades 44 radially outside and forward of the forward seal plate 56.

An annular flow inducer 86 extends aft from the inner case 54 which has suitable apertures therein for channeling the CDP air 34 through the internal blade cooling circuits 74 in an otherwise conventional manner. The inducer 86 includes a row of inducer vanes which direct the CDP air 34 tangentially from the stationary inducer 86 through apertures in the rotating forward blade retainer 84.

The CDP air is then channeled radially outwardly in the flow cavity between the blade retainer 84 and the seal plate 56 to provide the CDP air through a side inlet formed in the dovetails of the corresponding turbine blades. The base of the blades remains solid to separate the interstage bleed air below the dovetails from the CDP air in the blades.

The use of the CDP air for cooling the first stage turbine blades 44 is otherwise conventional and has the fundamental disadvantage of reducing overall efficiency of the engine. However, the use of the interstage bleed air for cooling the forward face of the first stage turbine disk 46 provides a separate and significant advantage in rotor cooling and life.

Furthermore, FIGS. 2 and 4 illustrate various sources for interstage bleed air for cooling the turbine rotor independently of the turbine blades. Instead of the fifth stage bleed air, the bleed air may be similarly extracted from the third compressor stage following the third compressor blades 3. In this configuration, the tubular baffle 68 extends suitably upstream to the corresponding third compressor disk while providing access through the bores of the downstream compressor disks for extending the interstage cooling circuit 48.

The use of the third stage bleed air enjoys the yet lower temperature T3 thereof, while accommodating the even lower static pressure P3 of this early stage compressor bleed.

Since the interstage bleed air may be channeled axially through dovetail slots 52 shown in FIG. 4 it is discharged in the plane following the trailing edge of the first stage blades 44 in which the combustion gases have lost significant pressure following travel through the nozzle vanes 42 and turbine blades 44. The static pressure P3 of the third stage bleed air is still greater than the static pressure PS in the combustion gases 38 along the trailing edges of the first stage turbine blades 44, but is not greater than the total relative pressure PTR along the leading edges of the first stage blades. Since CDP air is now being used to cool the first stage blades 44, the lower static pressure of the third stage bleed air is not relevant in this embodiment.

By recognizing that CDP air is no longer required for cooling the forward face of the first stage turbine disk and the first stage turbine blades mounted thereto, significant increase in efficiency of the engine may be obtained using the lower pressure and lower temperature interstage bleed air instead.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A gas turbine engine comprising:
    a multistage axial compressor including rows of compressor blades for pressurizing air;
    an annular combustor disposed in flow communication with said compressor for mixing fuel with said pressurized air to generate combustion gases;
    a high pressure (HP) turbine including a row of first stage HP turbine blades having dovetails mounted in corresponding dovetail slots in the perimeter of a supporting HP rotor disk joined by a shaft to said compressor blades;
    said HP disk including a web extending inwardly from said perimeter with a forward face terminating in a wider hub, and a forward seal plate extending radially along said forward face to define an annular manifold in flow communication with said dovetail slots; and
    an interstage cooling circuit joined in flow communication from a bleed inlet extending radially inwardly between adjacent rows of said compressor blades in an intermediate stage of said compressor to said manifold for channeling interstage bleed cooling air thereto.

2. An engine according to claim 1 wherein:
    said combustor is supported around an inner case; and
    said interstage cooling circuit is disposed inside said shaft between said compressor and said HP disk in flow communication with said manifold.

3. An engine according to claim 2 wherein:
    said shaft is fixedly joined to said disk web at a secondary hub at the base of said forward seal plate; and
    said interstage cooling circuit is bounded by a tubular baffle extending axially from said secondary hub upstream to said intermediate stage.

4. An engine according to claim 3 wherein said compressor intermediate stage includes a compressor disk supporting a corresponding row of said compressor blades, and said baffle extends forward to the hub of said compressor disk.

5. An engine according to claim 4 wherein said cooling circuit further bleed inlet comprises a plurality of inlet tubes extending radially inwardly from said compressor blades along said compressor disk to channel said interstage bleed air to said manifold.

6. An engine according to claim 5 wherein:
    said HP turbine includes a first stage HP turbine nozzle having a row of stator vanes disposed between said combustor and said HP blades for dropping pressure in said combustion gases across the leading and trailing edges of said vanes;
    each of said HP blades further includes a forward row of first cooling holes extending radially along said leading edge thereof, and an aft row of second cooling holes extending radially along said trailing edge thereof, for discharging blade cooling air from an internal blade cooling circuit;
    said HP blades are configured for additionally dropping pressure in said combustion gases across the leading and trailing edges thereof; and
    said intermediate compressor stage is disposed upstream from the last stage of said compressor to effect a static pressure in said bleed air greater than the static pressure in said combustion gases at said trailing edges of said HP blades.

7. An engine according to claim 6 further comprising:
    a seal frame extending radially inwardly from said inner case to sealingly join labyrinth seal teeth extending radially outwardly from said secondary hub; and
    wherein said blade cooling channels are disposed in flow communication with said manifold for receiving said interstage bleed air therefrom.

8. An engine according to claim 7 wherein said intermediate stage is configured to effect a static pressure in said bleed air greater than the total relative pressure in said combustion gases at said leading edges of said HP blades.

9. An engine according to claim 6 wherein said blade cooling channels are disposed in flow communication with said last stage of said compressor in a circuit independent from said interstage cooling circuit.

10. An engine according to claim 9 further comprising:
    a forward blade retainer extending radially outwardly from said secondary hub to said HP blades outside said forward seal plate; and
    an annular inducer extending aft from said inner case for channeling compressor discharge air through said HP blades.

11. A gas turbine engine comprising:
    a multistage compressor including rows of compressor blades for pressurizing air;
    a combustor disposed in flow communication with said compressor for mixing fuel with said pressurized air to generate combustion gases;
    a high pressure (HP) turbine including a row of first stage HP turbine blades mounted to the perimeter of an HP rotor disk joined by a shaft to said compressor blades, and disposed in flow communication with said combustor for extracting energy from said gases to power said compressor; and
    an interstage cooling circuit joined in flow communication from a bleed inlet extending radially inwardly between adjacent rows of said compressor blades in an intermediate stage of said compressor to a forward face of said HP disk between said shaft and said HP blades for channeling interstage bleed cooling air thereto.

12. An engine according to claim 11 wherein:
    said HP turbine includes a first stage HP turbine nozzle having a row of stator vanes disposed between said combustor and said HP blades for dropping pressure in said combustion gases across the leading and trailing edges of said vanes;
    said HP blades are configured for additionally dropping pressure in said combustion gases across the leading and trailing edges thereof; and
    said intermediate compressor stage is disposed upstream from the last stage of said compressor to effect a static pressure in said bleed air greater than the static pressure in said combustion gases at said trailing edges of said HP blades.

13. An engine according to claim 12 wherein said intermediate stage is at least two stages upstream from said last compressor stage.

14. An engine according to claim 12 wherein said intermediate stage is configured to effect a static pressure in said bleed air greater than the total relative pressure in said combustion gases at said leading edges of said HP blades.

15. An engine according to claim 12 wherein said intermediate stage is configured to effect a static pressure in said bleed air less than the total relative pressure in said combustion gases at said leading edges of said HP blades, yet still greater than said static pressure in said combustion gases at said trailing edges of said HP blades.

16. An engine according to claim 12 wherein:
said combustor is supported around an inner case;
said HP blades are mounted in corresponding dovetail slots in said HP disk perimeter; and
said interstage cooling circuit is disposed inside said shaft between said compressor and said HP disk in flow communication with said slots.

17. An engine according to claim 16 wherein:
said HP turbine further includes a forward seal plate extending radially along said disk forward face and spaced axially therefrom to define an annular manifold disposed in flow communication with said dovetail slots around said disk perimeter; and
said interstage cooling circuit is joined in flow communication with said manifold.

18. An engine according to claim 17 wherein:
said HP disk further includes a web extending radially inwardly from said perimeter thereof terminating in a wider hub;
said shaft is fixedly joined to said disk web at a secondary hub at the base of said forward seal plate; and
said interstage cooling circuit is bounded by a tubular baffle extending axially from said secondary hub upstream to said intermediate stage.

19. An engine according to claim 18 wherein said compressor intermediate stage includes a compressor disk supporting a corresponding row of said compressor blades, and said baffle extends forward to the hub of said compressor disk.

20. An engine according to claim 19 wherein said bleed inlet comprises a plurality of inlet tubes extending radially inwardly from said compressor blades along said compressor disk to channel said interstage bleed air to said manifold.

21. An engine according to claim 18 wherein:
each of said HP blades further includes a forward row of first cooling holes extending radially along said leading edge thereof, and an aft row of second cooling holes extending radially along said trailing edge thereof, for discharging blade cooling air from an internal blade cooling circuit; and
said blade cooling channels are disposed in flow communication with said compressor for receiving pressurized blade cooling air therefrom.

22. An engine according to claim 21 wherein said blade cooling channels are disposed in flow communication with said manifold for receiving said interstage bleed air therefrom.

23. An engine according to claim 22 further comprising a seal frame extending radially inwardly from said inner case to sealingly join labyrinth seal teeth extending radially outwardly from said secondary hub.

24. An engine according to claim 21 wherein said blade cooling channels are disposed in flow communication with said last stage of said compressor in a circuit independent from said interstage cooling circuit.

25. An engine according to claim 24 further comprising:
a forward blade retainer extending radially outwardly from said secondary hub to said HP blades outside said forward seal plate; and
an annular inducer extending aft from said inner case for channeling compressor discharge air through said HP blades.

26. A method of cooling a high pressure (HP) turbine in gas turbine engine having a multistage compressor providing pressurized air to a combustor for generating hot combustion gases from which energy is extracted in said turbine, comprising:
bleeding interstage pressurized air radially inwardly from between adjacent blade rows in said compressor;
channeling said interstage bleed air to a forward face of a first stage HP disk in said turbine for cooling thereof; and
channeling said interstage air radially outwardly over said forward face into dovetail slots in the perimeter of said disk.

27. A method according to claim 26 wherein said HP turbine includes a nozzle having vanes disposed between said combustor and a row of HP turbine blades mounted to the perimeter of said HP disk, and further comprising:
dropping pressure in said combustion gases across the leading and trailing edges of said vanes;
dropping pressure in said combustion gases across the leading and trailing edges of said blades; and
bleeding said interstage air upstream from the last stage of said compressor to effect a static pressure in said bleed air greater than the static pressure in said combustion gases at said trailing edges of said blades.

28. A method according to claim 27 wherein said interstage air is bled from said compressor with a static pressure greater than the total relative pressure in said combustion gases at said leading edges of said blades.

29. A method according to claim 28 further comprising channeling said interstage air from said disk forward face into said blades for internal cooling thereof, and then discharging said air through outlet holes along said leading and trailing edges of said blades with corresponding backflow margins.

* * * * *